July 9, 1946.  J. J. ROZNER  2,403,460
BALL BEARING
Filed Jan. 8, 1944  2 Sheets-Sheet 1
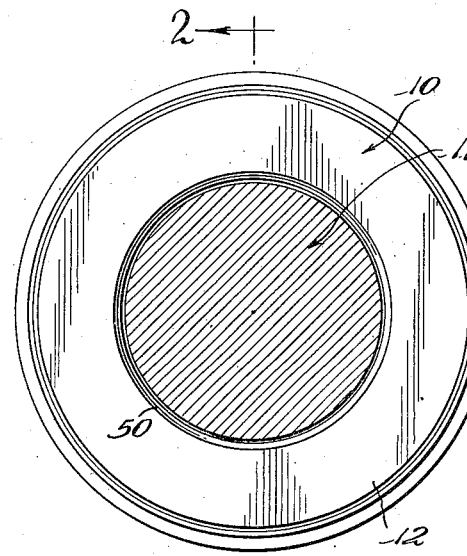
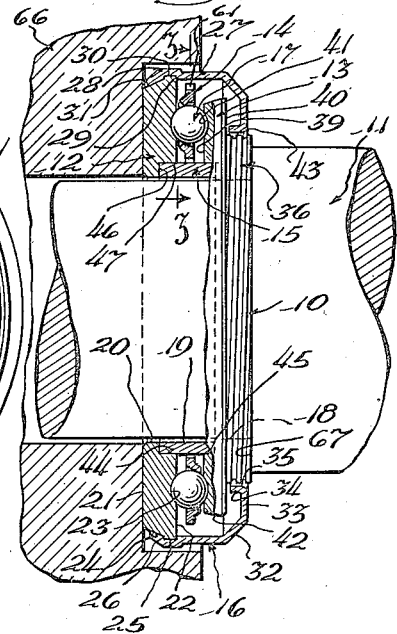
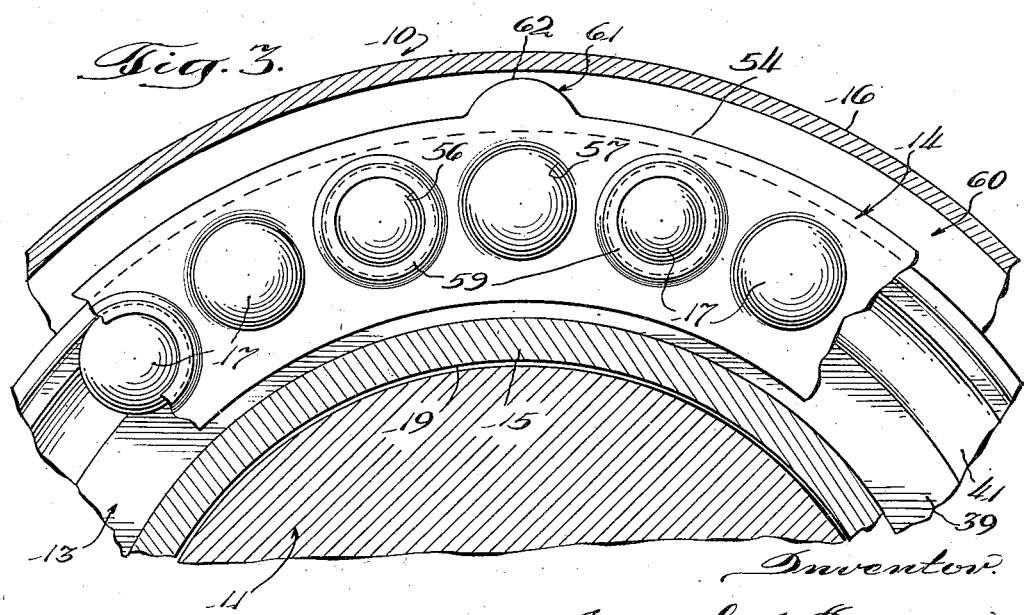
Inventor
Joseph J. Rozner
By McCalet, Wendt and Dickinson
Attorneys July 9, 1946.  J. J. ROZNER  2,403,460
BALL BEARING
Filed Jan. 8, 1944  2 Sheets-Sheet 2
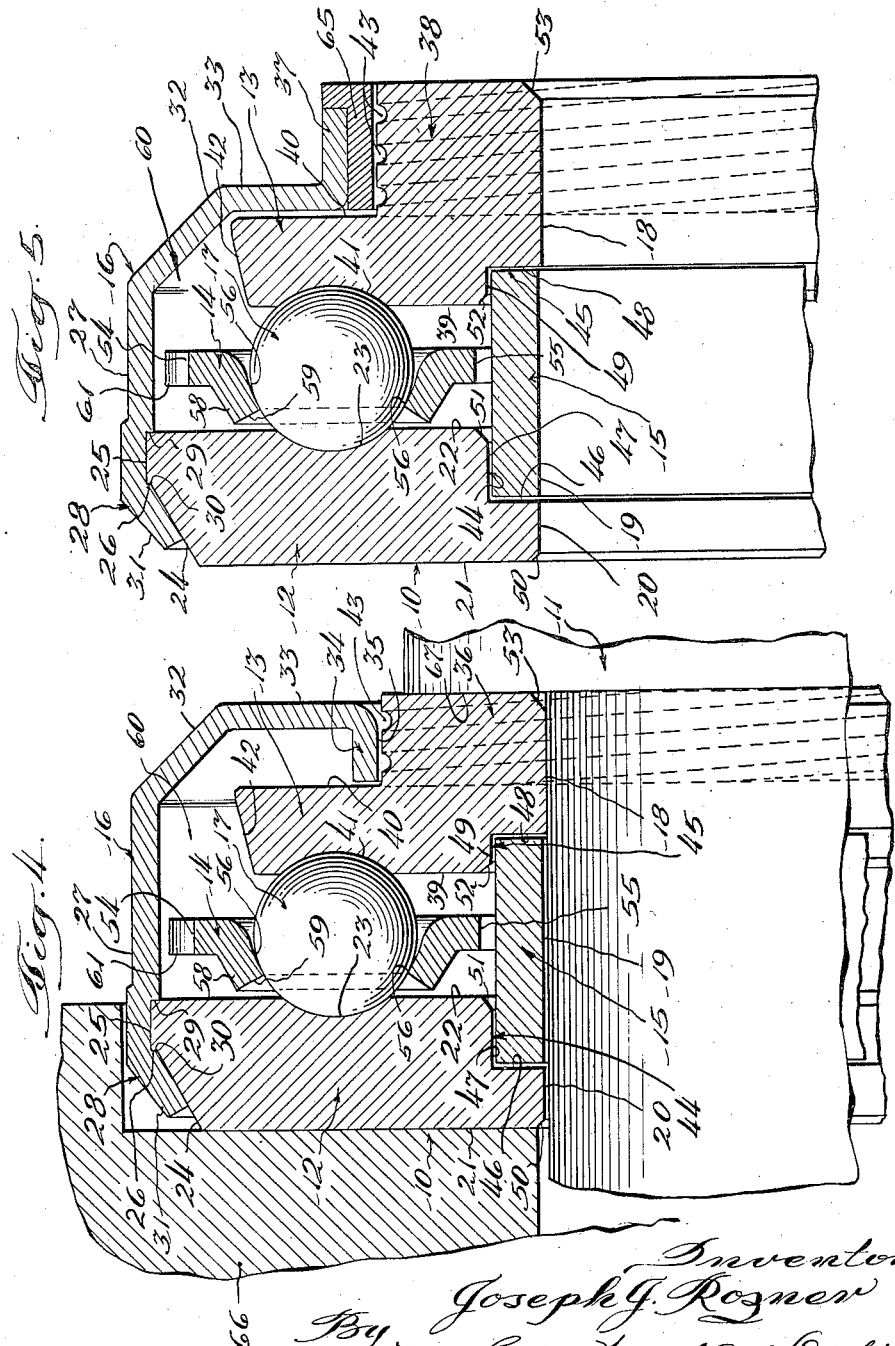
Inventor
Joseph J. Rozner
By McCaleb, Wendt & Dickinson
attorneys Patented July 9, 1946

2,403,460

UNITED STATES PATENT OFFICE 2,403,460

BALL BEARING

Joseph J. Rozner, Chicago, Ill., assignor to Aetna Ball Bearing Manufacturing Company, Chicago, Ill., a corporation of Illinois Application January 8, 1944, Serial No. 517,501

6 Claims. (Cl. 308—233)

The present invention relates to ball bearings and is particularly concerned with improvements in ball bearings whereby the friction involved is reduced to a minimum and the bearings are maintained in a constant state of lubrication without substatial loss of lubricant.

One of the objects of the invention is the provision of an improved ball bearing structure having a minimum amount of friction between its parts, which is adapted to keep the lubricant in the housing of the bearing by virtue of the motion of the parts of the bearing structure as distinguished from the maintenance of a sealing contact between the parts.

Another object of the invention is the provision of improved ball bearings which are so constructed that the lubricant in the housing of the bearing is constantly maintained in a homogeneous condition so that lubricant is available for all of the parts which frictionally engage another part.

Another object of the invention is the provision of ball bearings having an improved free floating ball separator which is adaptel to be rotated during the normal operation of the bearing at a speed of approximately one half the relative speed between the two races of the ball bearing and which is provided with a homogenizer for keeping the lubricant in a state of constant agitation.

Another object of the invention is the provision of an improved ball bearing structure which is simple, efficient, sturdy, and capable of economical manufacture so that it may be placed within the means of a large number of purchasers.

Other objects and advantages will be apparent from the following description and the accompanying drawings in which similar characters of reference indicate similar parts throughout the several views.

Referring to the drawings, of which there are two sheets,

Figure 1 is an end elevational view of a ball bearing constructed according to the invention, mounted on a shaft and shown in cross section on a plane normal to the axis of the shaft;

Fig. 2 is a sectional view taken on the plane of the line 2—2 of Fig. 1, looking in the direction of the arrows with the shaft shown in elevation;

Fig. 3 is an enlarged fragmentary sectional view taken on the plane of the line 3—3 of Fig. 2 looking in the direction of the arrows;

Fig. 4 is an enlarged fragmentary sectional view taken on the same plane as the view in Fig. 2 showing the details of structure of the bearing; and Fig. 5 is a similar view of a modification.

Referring to Fig. 1, 10 indicates in its entirety a bearing embodying the invention and 11 indicates the shaft on which it is mounted. The bearing may comprise a pair of races 12, 13, a ball separator 14, a floating sealing member 15, a housing 16, and a multiplicity of steel balls 17.

66 indicates a member having a recess for receiving the ball bearing structure against which or by means of which a thrust is placed upon the ball bearing. 67 indicates an annular shoulder on the shaft 11 which reacts against the ball bearing and places the thrust upon it.

Either one of the races 12 or 13 may be the fixed race with respect to the shaft 11 but in the embodiments illustrated, the race 13 is preferably the fixed race with respect to shaft 11 and this race 13 is provided with a bore 18 adapted to have a tight pressed frictional fit on the shaft 11. For this purpose the bore 18 of race 13 may be slightly smaller than the bore 19 or the bore 20 of the floating sealing member 15 and other race 12 respectively, such as for example a 10/1000" smaller diameter.

The movable race 12 may comprise an annular member of steel which is provided with the outer plane surface 21 and inner plane surface 22 but the latter surface is provided with a ball bearing raceway or groove 23 circular in elevation and also partially circular in cross section. The radius on which the groove 23 is formed is substantially that of the steel balls 17 so that the balls 17 are adapted to roll in the groove 23 with a line contact across the cross section of the groove.

The race member 12 may have its periphery formed with a frusto-conical surface 24 and a larger cylindrical surface 25 with an annular shoulder 26 between these surfaces. The sheet metal housing 16 also preferably comprises an annular member which is formed with a main cylindrical wall 27 and with a gripping portion 28 that has a substantial fit with the periphery of the race member 12. Thus, the gripping portion of the housing 16 has an annular shoulder at 29 and a second annular shoulder at 30 on each side of the cylindrical surface 25 of race member 12.

The end flange portion 31 of the housing 16 is bent inwardly to frusto-conical form engaging the frusto-conical surface 24 on race member 12 so that the housing 16 is permanently attached to the race member 12.

At its other end the housing 16 may be of any desired shape such as for example it may have a frusto-conical wall at 32 and an inwardly extending radial wall at 33 but it is preferably provided with a cylindrical wall 34, the inner cylindrical surface 35 of which is located in close proximity to but out of contact with a hub portion 36 on the race 13.

In the embodiment of Figs. 2 and 4, the cylindrical flange 34 is turned inwardly as will be more easily seen from Fig. 4 but in the embodiment of Fig. 5 this flange is turned outwardly and is indicated by the numeral 37.

The fixed race 13 may also be provided with an inner plane surface 39 and an outer annular plane surface 40 and the inner plane surface 39 is provided with a ball groove 41 which may be of the same shape, appearance and structure as the ball groove 23 previously described for the other race. The periphery 42 of this race may be of substantially frusto-conical form, tapering inwardly, and the hub portion 36 is of reduced diameter as compared with the periphery 42.

The hub portion 36 is preferably provided with a spirally extending groove 43 and the groove 43 may be partially circular in cross section. The direction in which the spiral of the groove 43 extends is so arranged with respect to the direction in which the housing 16 is to rotate with respect to hub 36, that any lubricant which is carried by the inner cylindrical surface 35 of flange 34 on the housing progresses along the spiral groove 43 and is drawn inwardly into the housing by the thread of the screw. Thus the spiral groove 43 is constantly tending to carry lubricant into the housing when the bearing is rotating in the proper direction.

Both the race members 12 and 13 are preferably provided with angular recesses 44, 45, for receiving the floating sealing member 15 and there is preferably a slight clearance between the external surfaces of the sealing member 15 and each of these recesses. Thus the sealing member is free to float and it may stand still or rotate, depending upon the conditions of operation.

The recess 44 is defined by the radial surface 46 and cylindrical surface 47 while the recess 45 is defined by the radial surface 48 and cylindrical surface 49. The races are also preferably suitably chamfered at 50, 51, 52, 53, at the inner corners of these races.

The ball separator 14 preferably comprises a sheet metal member of pressed steel which is annular in shape and provided with a cylindrical outer surface 54 and cylindrical inner surface 55. The ball separator may be made of specially hardened or non-hardened steel. The cylindrical inner surface 55 has a predetermined clearance with respect to the floating sealing member 15 so that the sealing member 15 may float freely and the ball separator 14 would move at a speed which is approximately half the relative speed between the races.

The ball separator 14 is formed with a multiplicity of regularly spaced ball sockets 56 tapered in one direction, that is, toward the left, and a multiplicity of regularly spaced ball sockets 57 tapered toward the right and the right-hand ball sockets are located alternately with respect to the left-hand ball sockets. These ball sockets may be formed by outwardly extending frusto-conical or partially spherical flanges 58 surrounding a through bore 59 which permits the ball to project from the bore into contact with the adjacent race. Each ball is held in its proper position by the engagement with the races and by the ball separator which is provided with oppositely disposed tapered sockets 56, 57 so that the separator itself is centered between the two races.

In order to maintain the lubricant in the housing chamber 60 in a uniformly distributed and homogeneous condition, the ball separator 14 may be provided with a radially extending lug 61 which I prefer to call a homogenizer. This lug 61 may consist of nothing more than a flat radial extension of the ball separator 14 located on the cylindrical periphery 54 of the ball separator and the homogenizer 61 may have an external cylindrical surface 62.

The bearing chamber 60 is preferably filled with relatively thick lubricant of the semi-solid type and when the bearing is operated, the ball separator 14 rotating at half speed causes the homogenizer 61 to progress through the lubricant and the lubricant is maintained in a constant state of agitation and in homogeneous condition.

Referring to Fig. 5, this is a modification in which the housing flange 37 corresponding to the flange 34 of the previous embodiment is outwardly turned instead of inwardly. Like the form shown in Figs. 3 and 4, the bearing is adapted to use on a horizontally disposed shaft and to uses in which it is subjected to axial thrust. In such adaptations and when considered practically from a manufacturing standpoint, as well as from the standpoint of wear in use, it may be understood that the normal clearances between parts permit slight variations in the alignments of parts when running with thrust applied and when stationary. The bearings of my present invention take into account such variations of alignment between parts during running and when stationary and have provisions for their reduction and the elimination of detrimental effects. The modification shown in Fig. 5 illustrates the use of a bushing 65 of a dissimilar metal such as brass, bearing metal, compressed powdered metal, or bronze, having a frictional fit in the cylindrical bore formed by the flange 37 and having an outwardly extending radial flange for determining its final position. This bearing bushing of dissimilar metal has a running fit with the hub 38 and performs the same function as the flange 34 in connection with hub 36. For example, the complementary bearing surfaces on the members 65 and 38, 34 and 36 serve to keep the races of the ball bearing in substantial alignment when there is no thrust on the bearing, and there will be less drop-down between the various floating parts of the bearing when the thrust is received than in any other devices of the prior art. The shift of relative positions between the parts caused by the application and release of thrust is understood as a difference between stationary and running alignment of the parts. When a thrust comes on the bearings herein disclosed the balls and races will already be in substantial alignment and there will be less chance of cracking or breakage of balls due to the sudden application of a heavy thrust.

The floating sealing member 15 is preferably rectangular in cross section and it may be constructed of a phenolic condensation compound or of steel or of a porous powdered metal composition having lubricating characteristics.

The operation of the ball bearings constructed according to the invention is as follows:

The race 13 has a pressed fit on the shaft 11 and rotates with the shaft but the race 12 has a clearance with respect to the shaft 11 and it rotates with respect to this shaft. It is held out of contact with the shaft 11 by the fact that it is supported through the intermediary of the balls 17 in their raceways which determine the concentric location of the race 12 with respect to the shaft.

The housing 16 is carried by the movable race 12 and it is maintained in concentric position with respect to the hub 36 of race 13 with respect to which it has a clearance and friction is prevented at this point by maintaining this concentricity and clearance.

Thus contact between the parts is reduced to a minimum and the parts are maintained in their proper positions with suitable clearance by means of the balls and their races and the friction is reduced to a minimum. The ball separator is adapted to move at approximately one half the speed of rotation of one race relative to the other. The homogenizer carried by this separator moves through the lubricant in the chamber 60 and keeps it in a constant homogeneous state while the bearing is operating.

Any lubricant which tends to leak out between the fixed race and the housing is constantly carried back into the housing by means of the spiral grooves on the hub of the fixed race and the present bearing may be used for a long period of time without necessity for replacing the lubricant or any part of the bearing.

The present ball bearing is adapted to have its parts comprising the two races and balls held in substantial alignment by the running fit between the movable or rotating race and the relatively fixed race having a hub. Thus there is less dropdown between the parts of the bearing when thrust is removed than in the devices of the prior art and when thrust is placed upon the bearing, the parts are already in substantial alignment and they are not snapped into alignment with such force as in the devices of the prior art where the drop-down is relatively great in degree. There is less danger of chipping the balls or raceway, or of causing fatigue, and less lost motion between the parts of the present bearing than in the devices of the prior art. The present devices are also adapted to operate with a minimum amount of noise.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a ball bearing the combination of a fixed race member adapted to be secured to a shaft or the like, said fixed race member being formed with a raceway for balls, a second movable race member provided with a raceway, a housing member carried by said second race member and extending over said fixed race member, said housing including a cylindrical flange extending axially inwardly of the housing to close proximity with the fixed race, a plurality of balls located in said raceways and adapted to maintain the concentricity of said housing with respect to said fixed race member, and spiral means carried by one of said members adjacent the inner surface of said cylindrical flange and acting upon the rotation of the relative parts of said ball bearing to cause escaping lubricant to be carried into said housing at the point where the flange is in proximity to the fixed race member, said spiral means comprising a plurality of ridges located on an outwardly extending cylindrical portion of said fixed race member.

2. In a ball bearing the combination of a fixed race member adapted to be secured to a shaft or the like, said fixed race member being formed with a raceway for balls, a second movable race member provided with a raceway, a housing member carried by said second race member and extending over into close proximity with a portion of said fixed race member and a plurality of balls located in said raceways and adapted to maintain the concentricity of said housing with respect to said fixed race member, and spiral means carried by one of said members and acting upon the rotation of the relative parts of said ball bearing to cause escaping lubricant to be carried into said housing at the point where the housing is in proximity to the fixed race member, said spiral means comprising a plurality of ridges located on an outwardly extending cylindrical portion of said fixed race member, and said housing being formed with an integral tubular flange extending inwardly of the housing and having an inner cylindrical surface closely adjacent said ridges.

3. In a ball bearing the combination of a pair of race members one of which is adapted to be fixed and the other of which is adapted to be secured to a rotating shaft, said races being provided with opposed grooves circular in plan and partially circular in cross section for receiving a plurality of balls, a ball separator located between said races and having a plurality of sockets for receiving said balls, the said sockets being alternately located on the opposite sides of said separator whereby the separator is maintained centrally between said races, a housing member carried by one of said races and fixedly secured thereto, and a cylindrical bearing hub carried by the other of said races, said housing member having a portion provided with a complementary cylindrical bearing surface having a running fit with said hub whereby the parts of said bearing are maintained in substantial alignment so that they are adapted to take the thrust applied to said bearing with a minimum amount of movement into running alignment.

4. In a ball bearing the combination of a pair of race members one of which is adapted to be fixed and the other of which is adapted to be secured to a rotating shaft, said races being provided with plane surfaces having opposed grooves circular in plan and partially circular in cross section for receiving a plurality of balls, a ball separator located between said races and having a plurality of sockets for receiving said balls, the said sockets being alternately located on the opposite sides of said separator whereby the separator is maintained centrally between said races, a housing member carried by one of said races and fixedly secured thereto, and a cylindrical bearing hub carried by the other of said races, said housing member having a portion provided with a complementary cylindrical bearing surface having a running fit with said hub whereby the parts of said bearing are maintained in substantial alignment so that they are adapted to take the thrust applied to said bearing with a minimum amount of movement into running alignment, said bearing also having an inner floating sealing member having a clearance with respect to both of said races for closing the chamber surrounding said balls.

5. In a ball bearing the combination of a pair of race members one of which is adapted to be fixed and the other of which is adapted to be secured to a rotating shaft, said races being provided with opposed grooves circular in plan and partially circular in cross section for receiving a plurality of balls, a ball separator located between said races and having a plurality of sockets for receiving said balls, the said sockets being alternately located on the opposite sides of said separator whereby the separator is maintained centrally between said races, a housing member carried by one of said races and fixedly secured thereto, and a cylindrical bearing hub carried by the other of said races, said housing member having a portion provided with a complementary cylindrical bearing surface having a running fit with said hub whereby the parts of said bearing are maintained in substantial alignment so that they are adapted to take the thrust applied to said bearing with a minimum amount of movement into running alignment, said housing being provided with a bushing of dissimilar metal for engagement with said hub.

6. In a ball bearing the combination of a pair of race members one of which is adapted to be fixed and the other of which is adapted to be secured to a rotating shaft, said races being provided with opposed grooves circular in plan and partially circular in cross section for receiving a plurality of balls, a ball separator located between said races and having a plurality of sockets for receiving said balls, the said sockets being alternately located on the opposite sides of said separator whereby the separator is maintained centrally between said races, a housing member carried by one of said races and fixedly secured thereto, and a cylindrical bearing hub carried by the other of said races, said housing member having a portion provided with a complementary cylindrical bearing surface having a running fit with said hub whereby the parts of said bearing are maintained in substantial alignment so that they are adapted to take the thrust applied to said bearing with a minimum amount of movement into running alignment, said hub being provided with spirally extending grooves and threads rotating in such way as to impel escaping lubricant into the housing when the parts of the bearing are in operation.

JOSEPH J. ROZNER.